(12) United States Patent
Adir et al.

(10) Patent No.: US 10,657,263 B2
(45) Date of Patent: May 19, 2020

(54) MANAGEMENT OF ALERTS USING A BUDGET-DEPENDENT ADJUSTABLE WORKING THRESHOLD

(71) Applicant: International Business Machines Corporation, Armonk, NY (US)

(72) Inventors: Allon Adir, Kiryat Tivon (IL); Ehud Aharoni, Kfar Saba (IL); Lev Greenberg, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 313 days.

(21) Appl. No.: 15/489,749

(22) Filed: Apr. 18, 2017

(65) Prior Publication Data
US 2018/0300486 A1 Oct. 18, 2018

(51) Int. Cl.
*H04L 29/06* (2006.01)
*G06F 21/57* (2013.01)
*G06Q 10/06* (2012.01)

(52) U.S. Cl.
CPC ............ *G06F 21/577* (2013.01); *G06F 21/57* (2013.01); *G06Q 10/067* (2013.01); *G06Q 10/0635* (2013.01); *G06F 2221/034* (2013.01)

(58) Field of Classification Search
CPC .................................. H04L 63/00; G06F 21/00
See application file for complete search history.

(56) References Cited

U.S. PATENT DOCUMENTS

| 7,308,714 | B2 | 12/2007 | Bardsley et al. | |
|---|---|---|---|---|
| 8,478,688 | B1 * | 7/2013 | Villa ...................... | G06Q 40/02 705/35 |
| 8,688,620 | B2 | 4/2014 | Viswanathan et al. | |
| 8,800,036 | B2 | 8/2014 | Khayam et al. | |
| 2013/0282896 | A1 | 10/2013 | Ge et al. | |
| 2015/0142642 | A1 * | 5/2015 | Suplee ................... | G06Q 40/02 705/39 |

OTHER PUBLICATIONS

Allen, "Splunk ITSI: Adaptive Thresholds and Anomaly Detection", InfoQ, Sep. 4, 2015.
Ghafouri et al., "Optimal Thresholds for Anomaly-Based Intrusion Detection in Dynamical Environments", 7th Conference on Decision and Game Theory for Security (GameSec 2016), Nov. 2016.

(Continued)

*Primary Examiner* — Edward Zee
*Assistant Examiner* — Leynna Truvan
(74) *Attorney, Agent, or Firm* — Dan Swirsky

(57) ABSTRACT

Setting a budget of alerts for single or multiple risk score types, adjusting a working threshold based on the set budget, wherein adjusting the working threshold is done by defining an reference threshold for an alert, providing a history of recorded risk scores within a budget sliding interval window and adjusting the working threshold such that a number of alerts which would have been provided by the recorded risk scores is calculated to stay within the set budget, and using the adjusted working threshold to normalize and optionally combine incoming risk scores so as to determine whether an incoming risk score should receive an alert.

3 Claims, 12 Drawing Sheets

(56) References Cited

OTHER PUBLICATIONS

Tian et al., "Reduction of False Positives in Intrusion Detection via Adaptive Alert Classifier", Proceedings of the 2008 IEEE International Conference on Information and Automation, Jun. 20-23, 2008, pp. 1599-1602.
Ali et al., "Automated Anomaly Detector Adaptation using Adaptive Threshold Tuning", ACM Transactions on Information and System Security (TISSEC), Apr. 2013, pp. 17:1-17:30, vol. 15, Issue 4.
Cardenas et al., "A Framework for the Evaluation of intrusion Detection Systems", 2006 IEEE Symposium on Security and Privacy, May 21-24, 2006.

\* cited by examiner

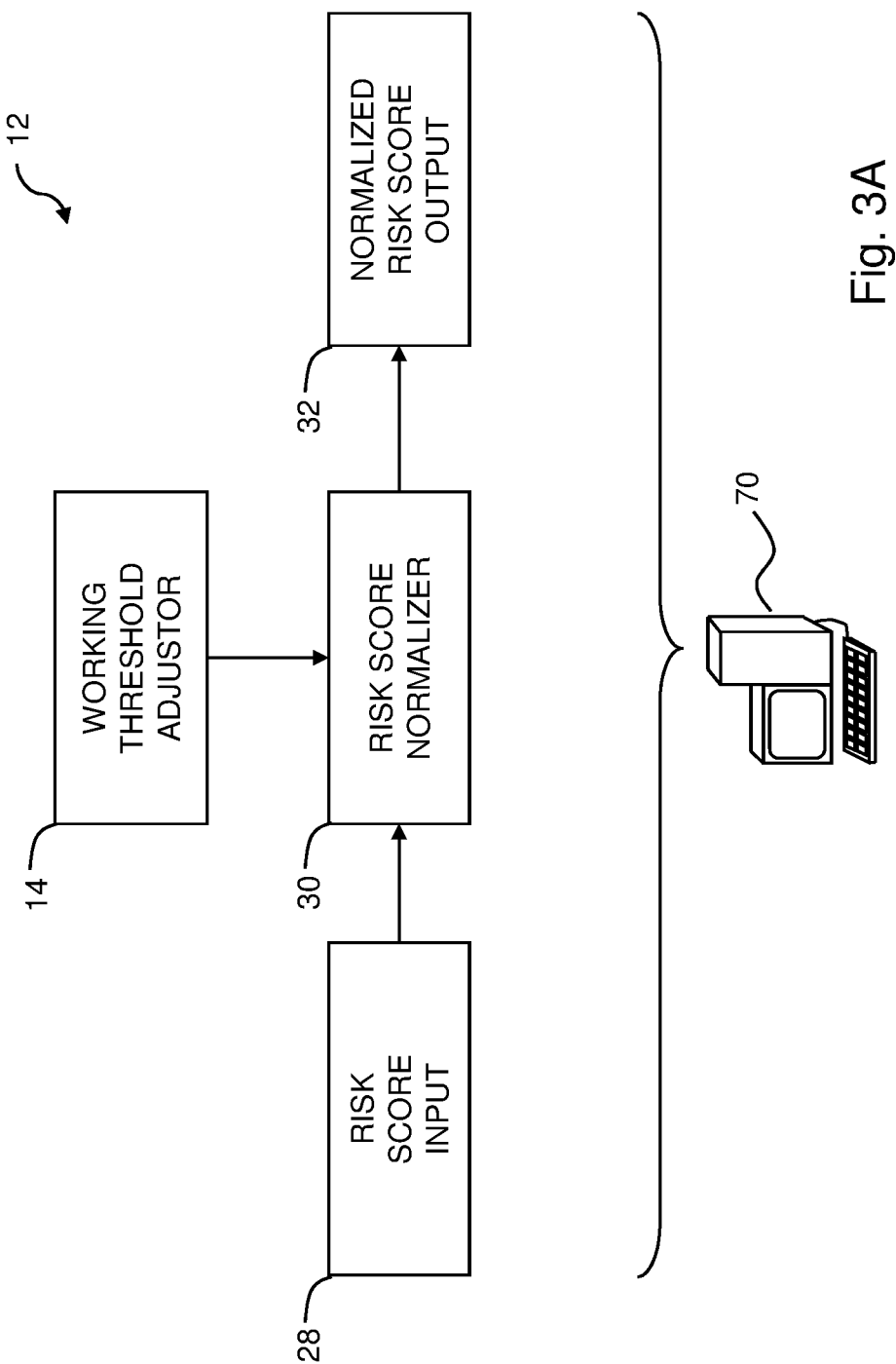

Step 3: Each hour keep 2*budget(=4) top scores

Step 3 (continuation):
Aggregate and sort scores for two weeks 01-01-2016 00:00
01-01-2016 01:00
01-01-2016 02:00

| # | User | Score |
|---|------|-------|
| 01 | U054 | 0.97 |
| 02 | U056 | 0.95 |
| 03 | U021 | 0.92 |
| 04 | U061 | 0.91 |

| # | User | Score |
|---|------|-------|
| 01 | U054 | 0.99 |
| 02 | U056 | 0.98 |
| 03 | U012 | 0.97 |
| 04 | U021 | 0.95 |
| ... | ... | ... |
| 672 | U013 | 0.93 |
| 673 | U101 | 0.92 |

Fig.10

MANAGEMENT OF ALERTS USING A BUDGET-DEPENDENT ADJUSTABLE WORKING THRESHOLD

BACKGROUND

Systems that periodically emit alerts related to events that occur over a particular analysis period generally attempt to reduce false alerts while avoiding missing important events. In a security system, false positives are generally tolerated for the sake of avoiding a false negative (i.e. missing a security event). However, the number of alerts that can be investigated is limited. Moreover, there are often multiple risk categories, or risk score types, which can trigger an alert, which further contributes to the high volume of alerts which may need to be followed up. There is thus a need for a system which can limit the number of alerts to a manageable amount without missing important events.

SUMMARY

In one aspect of the invention, there is provided a method for managing alerts in a system. The method includes setting a budget of alerts for suspicious activity, defining a working threshold based on the set budget, providing a history of recorded top risk scores within a budget sliding interval window, adjusting the working threshold such that a number of alerts which would have exceeded the working threshold by the recorded top risk scores is calculated to stay within the set budget, receiving a set of risk scores for evaluation of suspicious activity within the system during an analysis period, using the adjusted working threshold to normalize the received risk scores, and reporting an alert when any of the normalized risk scores is above a reference threshold.

In embodiments of the present invention, the method may further include at predetermined intervals iteratively repeating the step of adjusting the working threshold, wherein at each of the predetermined intervals, a new, more recent history of recorded top risk scores is provided and wherein the working threshold is updated based on the new provided recorded top risk scores and the set budget, thus resulting in a repeatedly adjustable working threshold. In additional embodiments of the present invention, the budget may be set for a single risk score type and adjusting the working threshold is done for the risk score type, or the budget may be set for multiple risk score types, and each of the multiple risk score types receives a portion of the budget. The received portions may be equal or may be different from one another for each of the risk score types. In some embodiments, when a combined risk score is used, a combined score working threshold is used for the combined risk score, wherein the combined score working threshold may be different than the working thresholds used for each individual risk score type.

In other aspects of the invention systems and computer program products embodying the invention are provided.

BRIEF DESCRIPTION OF THE DRAWINGS

Aspects of the invention will be understood and appreciated more fully from the following detailed description taken in conjunction with the appended drawings in which:

FIG. 3A is a simplified conceptual illustration of a risk score manager from a single risk score type of the system of FIG. 1, constructed and operative in accordance with an embodiment of the present invention;

FIG. 10 is a chart illustration of a first example of a method in accordance with embodiments of the invention.

DETAILED DESCRIPTION

The following terms used herein are now defined:

User: an active entity within the system. Examples of a user include a database user accessing a database system, a software application process accessing a file system, or the like.

Analysis period: A time period for which users' behavior is analyzed for suspicious activity. An example of an analysis period is an hourly period, wherein for the given hour, all users' activities within the hour are analyzed for suspicious activities.

Risk Score: A measurement of an estimated risk corresponding to one aspect of a user's activities within an analysis period.

Risk Score Type: A type or category of risk scores associated with a particular aspect of user's activities. An example of a risk score type is a risk associated with an accumulated length of time for accessing of a table in the database. Another example of a risk score type is a risk associated with a number of new tables accessed by a user. Another example of a risk score type is a risk associated with a number of times of accessing tables overall. A system can have single or multiple risk score types.

Risk Estimator: Provides risk scores for single or multiple risk score types of the user. The user's risk scores for each risk score type are calculated based on the user's models for the particular risk score type, and an assessment of how far the user's activities within an analysis period is from the models. A user behavior over an analysis period will have a single score for each of the available risk score types.

Alert: A notice issued by the system to indicate that suspicious activity of a user has taken place and requires further investigation. Alerts are triggered for the user based on the level of the user's risk scores of different types for a particular analysis period.

Alert Budget: A targeted average rate of alerts produced by the system, e.g., 2 alerts per day or 1 alert per hour.

Budget sliding interval window: A historical time interval used for adaptive selection of working thresholds to match the targeted alert budget. For example, a budget sliding interval window of two weeks will tune parameters for the current analysis period using historical scores from the last two weeks.

Working threshold: A threshold used to control rate of alerts generation, wherein the higher the working threshold, the lower the alert rate. The working threshold is adjusted dynamically to match the alert budget. The working threshold is determined for each risk score type.

Combined score working threshold: A working threshold used for combined risk score types. This working threshold may be different than the working threshold used for each individual risk score type.

Reference threshold: A minimal value of working threshold. This value also corresponds to minimal value of normalized scores to produce an alert.

Figure 1:
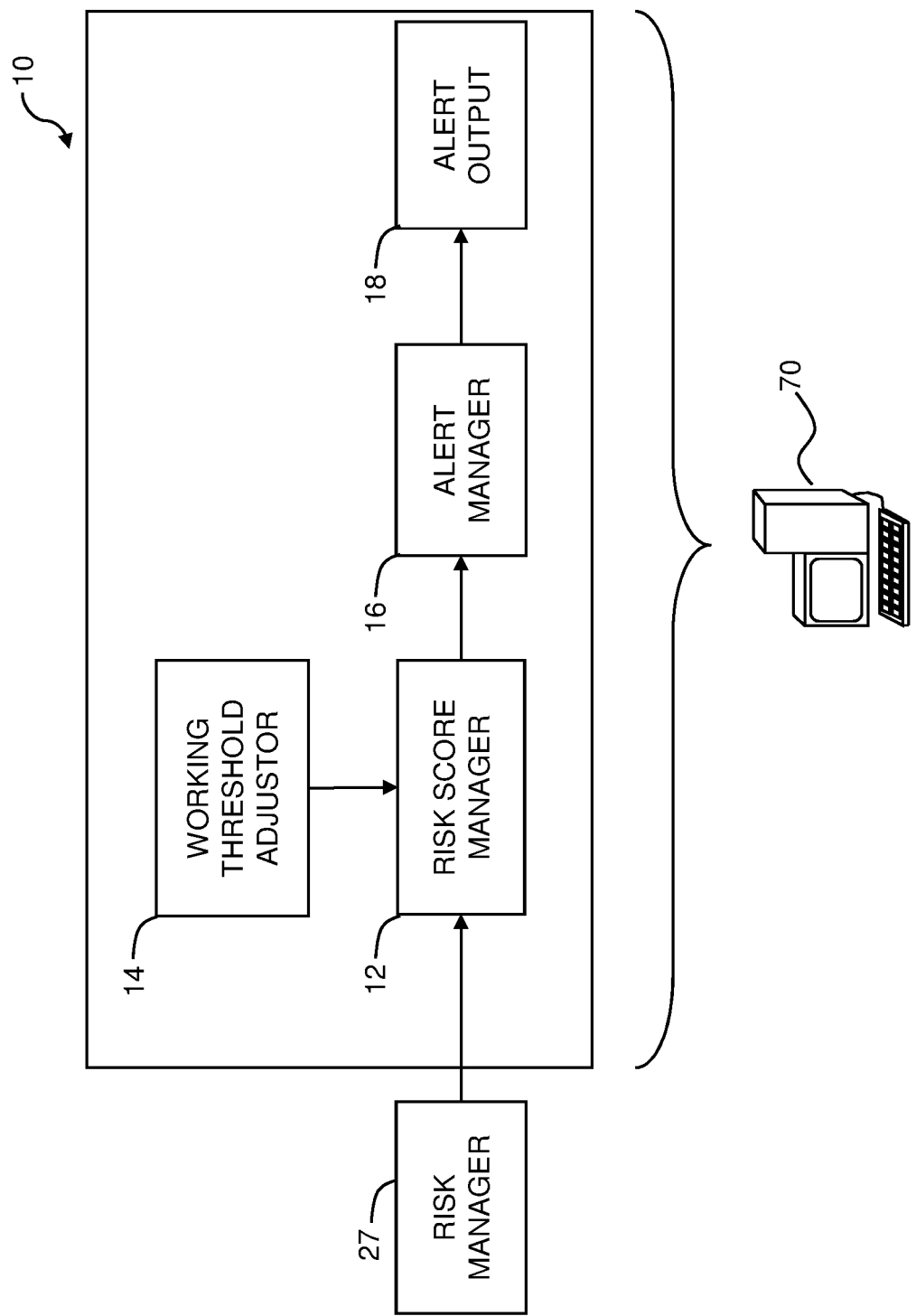
FIG. 1 is a simplified conceptual illustration of a system for managing alerts, constructed and operative in accordance with an embodiment of the invention.

Reference is now made to FIG. 1, which is a simplified conceptual illustration of a system 10 for managing alerts, constructed and operative in accordance with embodiments of the present invention. System 10 includes a risk score manager 12 for receiving and normalizing risk scores received from a risk estimator 27. Risk estimator 27 is external to system 10 and is configured to generate risk scores for a single risk score type or multiple risk score types (e.g. volume, number of new events) based on comparison of current data related to the risk score type to predetermined models of the risk score type (e.g. average volume, average number of new events). There are many known methods for generating risk scores. System 10 further includes a working threshold adjustor 14, which is configured to adjust a working threshold used to normalize risk scores. In one embodiment working threshold adjustor 14 is dynamic, in that the adjustment of the working threshold is done periodically, at predetermined intervals, thereby constantly improving the accuracy of system 10. System 10 further includes an alert manager 16, which is configured to determine when an alert should be issued based on comparison of normalized scores from risk score manager 12 to a reference threshold. System 10 further includes an alert output 18 for issuing an alert as determined by alert manager 16.

Figure 2:
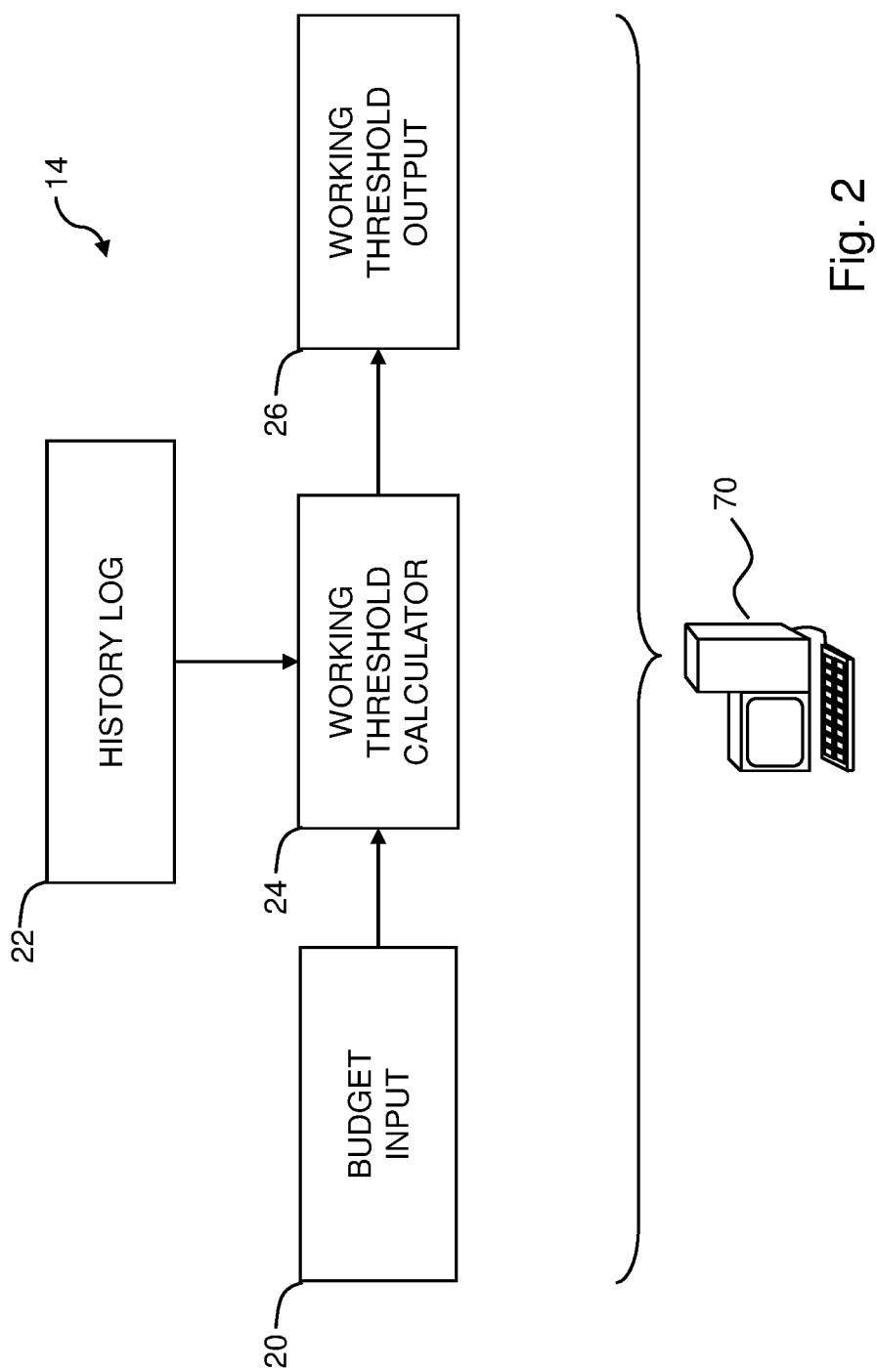
FIG. 2 is a simplified conceptual illustration of a working threshold adjustor from the system of FIG. 1, constructed and operative in accordance with embodiments of the present invention.

Reference is now made to FIG. 2, which is a simplified conceptual illustration of working threshold adjustor 14, constructed and operative in accordance with embodiments of the present invention. Working threshold adjustor 14 is configured to periodically adjust a working threshold in order to normalize incoming risk scores. Working threshold adjustor 14 includes a budget input 20, a history log 22, a working threshold calculator 24, and a working threshold output 26. Budget input 20 provides working threshold calculator 24 with a selected budget, set for a pre-determined period of time (e.g., X number of alerts per day) for alerts across all users for a particular risk score type. History log 22 records top scored past activity across the users, for a pre-determined historical budget sliding interval window (e.g., the previous two weeks) and for a pre-determined number of top scores per hour (e.g., 10 top scores per hour), and provides top historical scores to working threshold calculator 24 over the pre-determined historical period of time. Working threshold calculator 24 uses data from history log 22 and uses the set budget as provided by budget input 20 to calculate a threshold above which a number of alerts which is within the budget would have been issued. Based on this information, working threshold calculator 24 calculates an adjusted working threshold TH'. Adjusted working threshold TH' is output via working threshold output 26 into risk score manager 12, as depicted in FIG. 1. The entire procedure is repeated periodically at a particular frequency (e.g., once a day). In this way, system 10 is optimized to give increasingly accurate results. Although the working threshold adjustor 14 described herein is used for adjusting working thresholds for single risk score types, a similar system may be used for adjusting combined score working thresholds as well.

Reference is now made to FIG. 3A, which is a simplified conceptual illustration of risk score manager 12, constructed and operative in accordance with an embodiment of the present invention. In the embodiment shown herein, risk score manager 12 is configured to input data relating to a single risk score type into alert manager 16. For example, the single risk score type may be related to a number of events per time period (i.e. volume), number of new events, number of changes in types of events, or any other risk score type associated with user behavior in system 10. Risk score manager 12 operates periodically, where data from risk score manager 12 is processed via alert manager 16, and is used to produce alerts. Risk score manager 12 includes a risk score input 28, a risk score normalizer 30, and a normalized risk score output 32. Risk score input 28 inputs a risk score associated with the single risk score type over an analysis period. Risk score normalizer 30 receives an adjusted working threshold from working threshold adjustor 14, normalizes the received risk score and provides the normalized risk score via normalized risk score output 32 to alert manager 16.

Figure 3B:
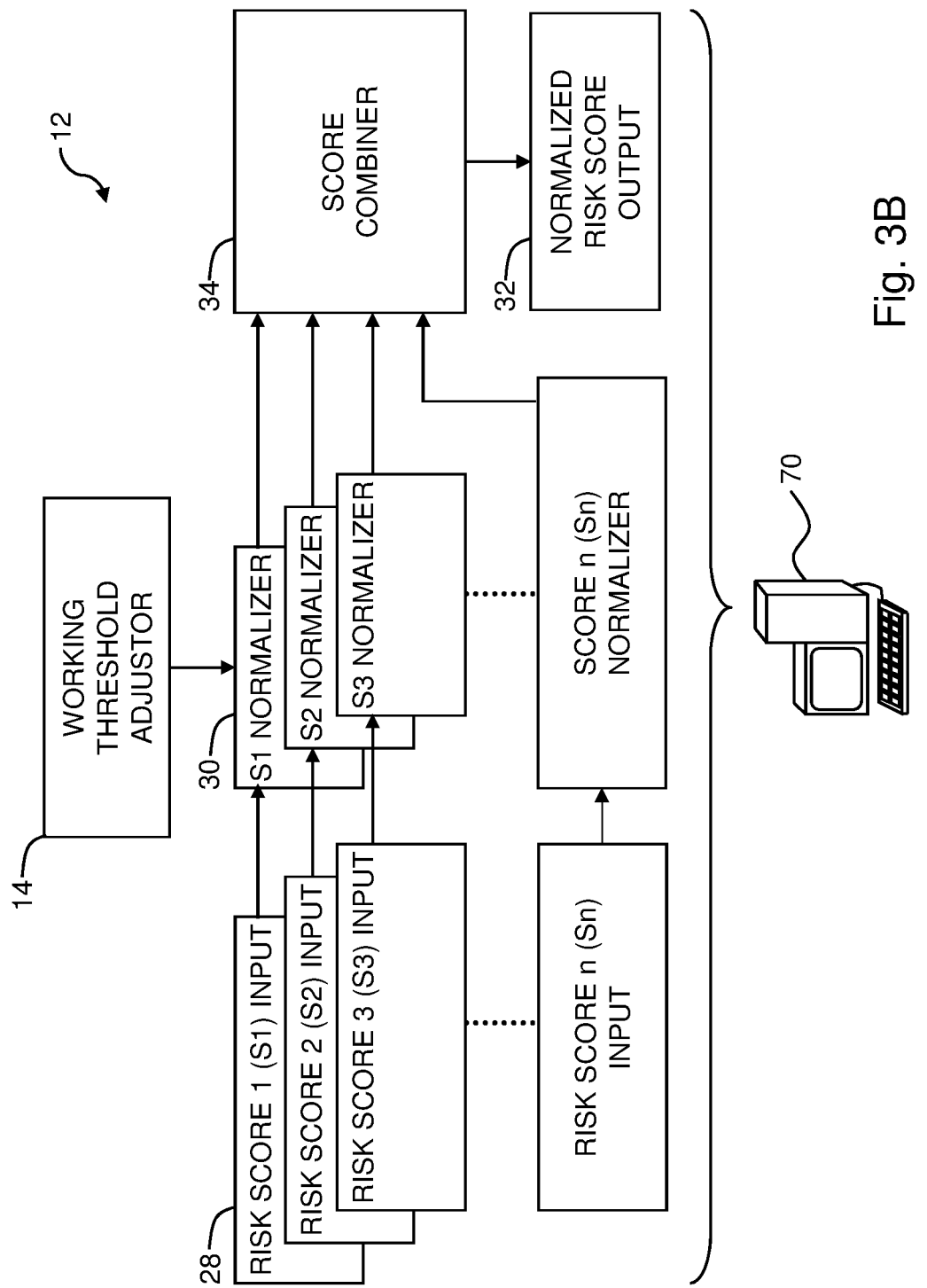
FIG. 3B is a simplified conceptual illustration of risk score manager from multiple risk score types of the system of FIG. 1, constructed and operative in accordance with an embodiment of the present invention.

Reference is now made to FIG. 3B, which is a simplified conceptual illustration of risk score manager 12, constructed and operative in accordance with another embodiment of the present invention. In the embodiment shown herein, risk score manager 12 is configured to provide data relating to multiple risk score types into alert manager 16. For example, the first risk score type may be related to volume of events and the second risk score type may be related to number of new events per time period. Risk score manager 12 operates periodically (for each analysis period), where data from risk score manager 12 is processed via alert manager 16, and is used to produce alerts. Risk score manager 12 includes a risk score input 28, a risk score normalizer 30, a risk score combiner 34 and a normalized risk score output 32. In the embodiment shown in FIG. 3B, risk score input 28 inputs risk scores relating to different risk score types (e.g. volume and new events), including a first risk score S1 for the first risk score type, a second risk score S2 for the second risk score type, and scores associated with up to n risk score types (Sn). Risk score input 28 inputs scores S1, S2, ... Sn over an analysis period. Risk score normalizer 30 normalizes each of the received scores (S1, S2, ... Sn) based on a combined adjusted working threshold received from working threshold adjustor 14, and sends the normalized risk scores (S1', S2', . . . Sn') to risk score combiner 34. Risk score combiner 34 is configured to combine risk scores S1 . . . Sn into a single combined risk score S*. The single, combined, normalized risk score S*' is sent via normalized risk score output 32 to alert manager 16. In some embodiments, the normalized risk scores (S1', S2', . . . Sn') are sent via normalized risk score output 32 to alert manager 16 as well.

Any of the elements shown in FIGS. 1, 2, 3A and 3B are preferably implemented by one or more computers in computer hardware and/or in computer software embodied in a non-transitory, computer-readable medium in accordance with conventional techniques, such as where any of the elements shown in FIGS. 1, 2, 3A and 3B are hosted by a computer 70.

Figure 4:
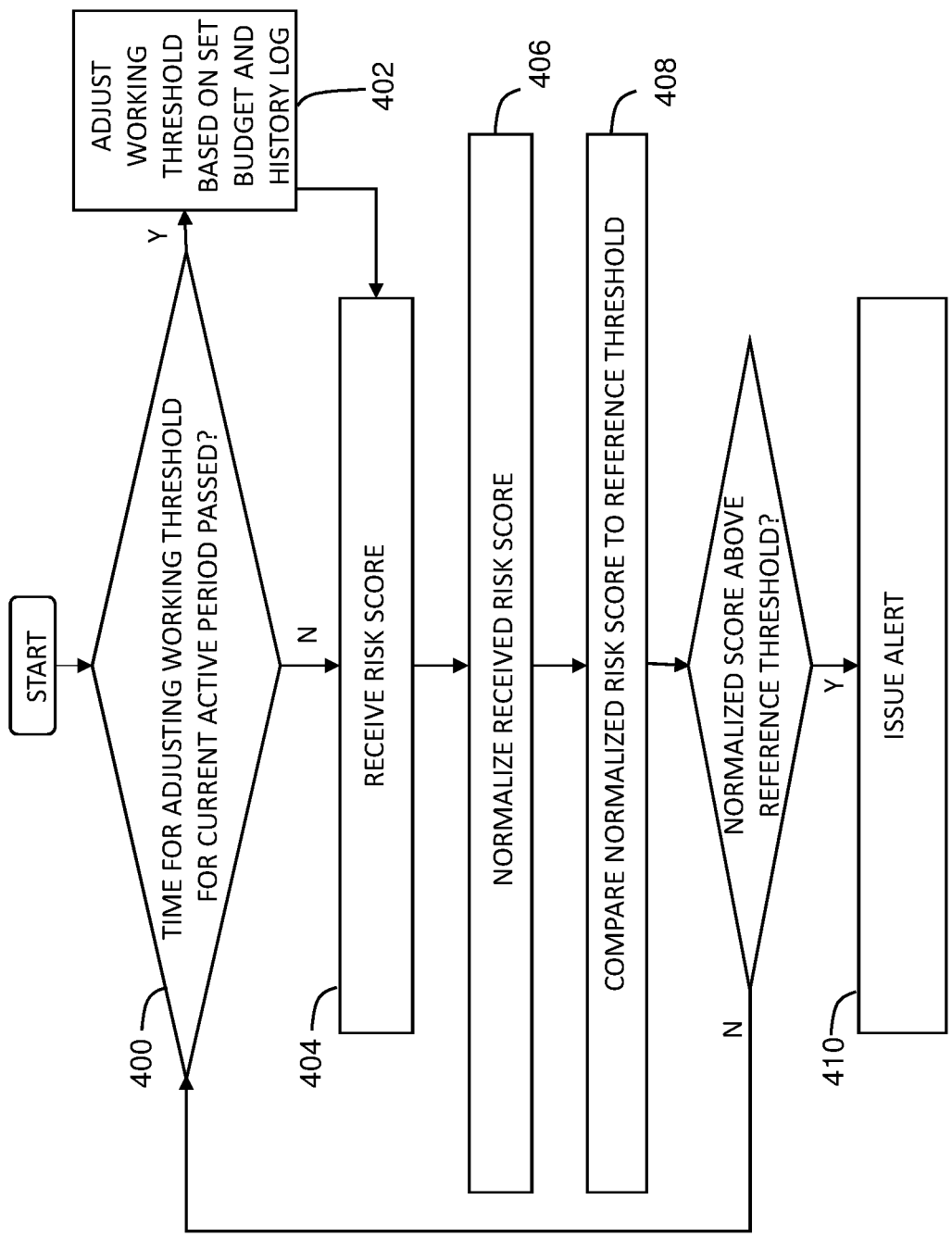
FIG. 4 is a simplified flowchart illustration of an exemplary method of operation of the system of FIG. 1 operative in accordance with an embodiment of the invention.

Reference is now made to FIG. 4, which is a simplified flowchart illustration of an exemplary method of operation of the system of FIG. 1 operative in accordance with an embodiment of the invention. First, if the time for adjusting the working threshold has passed (step 400), the working threshold is adjusted (step 402) based on a set budget and a historical log of top risk scores. The time for adjusting the working threshold may be any reasonable amount of time as determined by the system or according to a pre-set determination. For example, the working threshold may be adjusted every hour, every day, or at any suitable interval, preferably an integer number of analysis periods. Generally, each time the working threshold is adjusted, a new analysis period begins. For each user, risk scores are received (step 404) from a risk score estimator. The received risk scores are normalized (step 406) wherein the normalization process uses the current working threshold. Normalized risk scores are then compared to a reference threshold (step 408), and if the normalized risk scores are above the reference threshold, then an alert is issued (step 410). If not, the system continues to receive scores for the risk score estimator. This can be done for a single risk score type or multiple risk score types, and is generally performed for multiple users during the analysis period.

Figure 5:
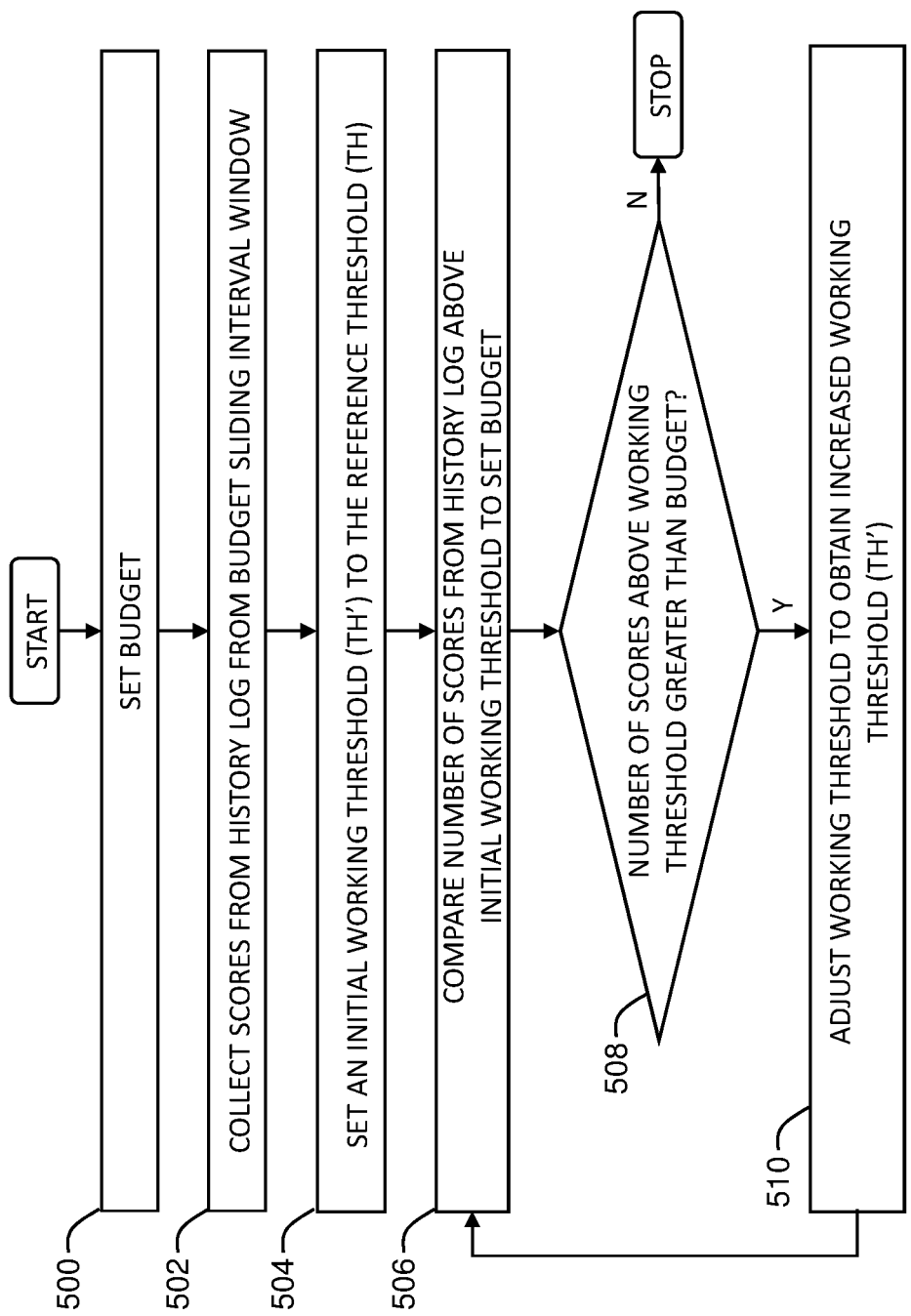
FIG. 5 is a simplified flowchart illustration of an exemplary method of operation of the working threshold adjustor of FIG. 2 operative in accordance with an embodiment of the invention.

Reference is now made to FIG. 5, which is a simplified flowchart illustration of an exemplary method of operation of the working threshold adjustor 14 of FIG. 2 operative in accordance with an embodiment of the invention. First, a budget B is set (step 500). This may be done by an external entity, such as a human, or by an automated system. The budget is generally described as X alerts per some designated time period (e.g. 2 alerts per hour; 5 alerts per day, etc.) The overall budget B has to account for alerts for all risk score types and as such is split per risk score type (and designated as Bi where risk score type i=1 . . . K) and as will be explained with reference to FIG. 8 will be used collectively for a combined score which accounts for all of the risk score types. Next, scores are collected (step 502) from a history log over a pre-defined budget sliding interval window. Next, an initial working threshold TH' is set equal to the reference threshold TH (step 504). The reference threshold TH serves as a limit below which scores are ignored and the low limit for working threshold TH'. The reference threshold TH may be chosen based on knowledge of the risk score types being used or on the basis of the problem domain. To determine whether it is desirable to raise the working threshold, the number of risk scores which would have been above the current working threshold TH' is compared to the budget (step 506). If the number of scores which would have been above the current working threshold TH' is greater than the budget (step 508), the working threshold TH' is adjusted (step 510) by increasing the threshold to a new adjusted working threshold TH' which would only allow for the budgeted number of scores to have been reported. The new adjusted working threshold TH' is then used going forward. In some embodiments, this is done separately for each risk score type, where an initial working threshold THi' is assigned using THi'=TH for every risk score type i=1 . . . K. It should be apparent that reference threshold TH will remain constant while the corresponding working threshold THi' values will be selected depending on the historical scores of each risk score type. In some embodiments, a combined normalized score adjusted working threshold (TH*)' will be used, as will be explained further hereinbelow. Periodically during operation of system 10, it may be desirable to adjust the threshold to match the alert budget.

In essence, THi' is set so that if it had been used throughout the historic interval than the budget would have been adhered to for risk score type i as much as possible.

It should be readily apparent that the method shown in FIG. 5 is an example of a method of dynamically adjusting a working threshold based on a history log and a set budget, but that the present invention is not limited to the example depicted in FIG. 5. Other ways of adjusting the working threshold are possible as well. In another example, all of the risk scores are sorted from high to low, and the scores matching the budgeted number of scores is directly selected. The working threshold is then set at the average of the selected scores. Many other methods can be used to determine the working threshold based on the budget and the history log, all of which are included within the scope of the present invention.

Figure 6:
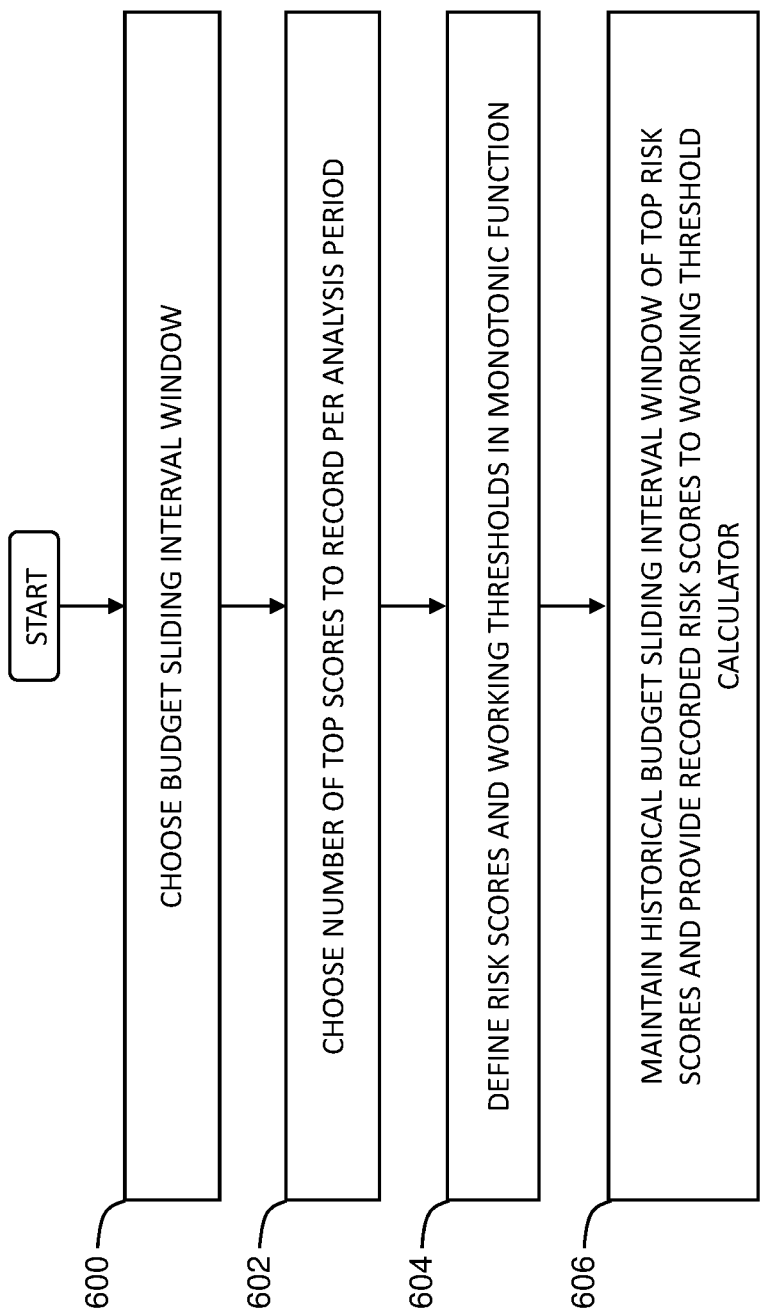
FIG. 6 is a flowchart illustration of an exemplary method of the steps of logging historic scores to be used in the working threshold adjustor of FIG. 2 operative in accordance with an embodiment of the invention.

Reference is now made to FIG. 6, which is a flowchart illustration of an exemplary method of the steps of logging historic scores. First, a budget sliding interval window is chosen (step 600). For example, the window may be a historical period of two weeks. Next, a number of top risk scores to record per analysis period is chosen (step 602). For example, it may be determined that a number of top scores which is ten times the budgeted number of scores are kept for the analysis period. Essentially, the number is determined such that it is large enough to accommodate a maximum expected number of alerts, but not too large that it would avoid a situation that one anomaly period with a very large number of high scores will greatly influence the budget. Risk scores and working thresholds are then defined (step 604) in a monotonic function. In an exemplary embodiment, this is done as follows: Define the function $L(x)=-\log(1-x)$. Let LSi designate the value L(Si) for i=1 . . . K. Call these the L-ed scores. Also define LTH=L(TH) and LTH'=L(TH')—the L-ed thresholds. Note that since the scores and the thresholds are all between 0 and 1, then the L-ed values are all non-negative. Then a historical sliding window of the top L-ed scores is maintained (step 606) and provided to the working threshold calculator. In the present embodiment, only L-ed scores that are greater than LTH need to be kept in the log, since the L-ed scores are monotonic.

Once the working threshold is adjusted in accordance with the history log and the chosen budget, the new working TH' is set and used to normalize the incoming scores.

Figure 7:
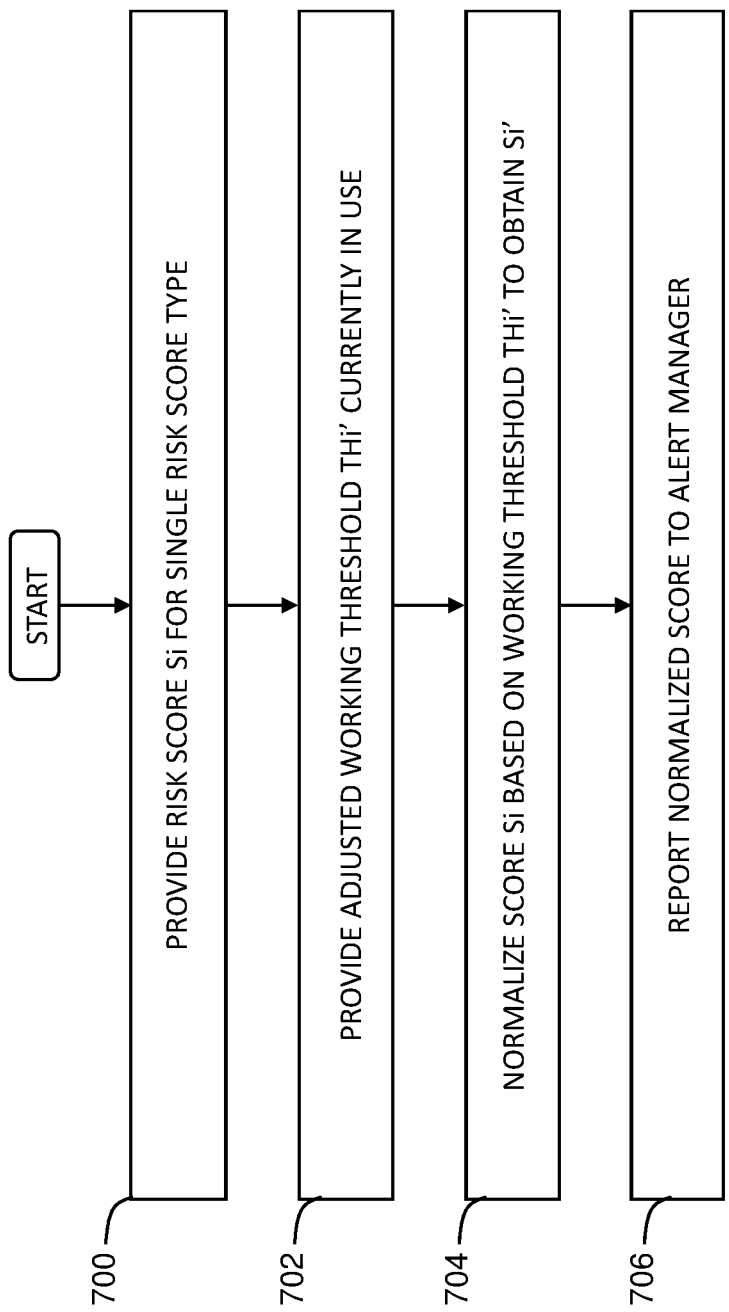
FIG. 7 is a flowchart illustration of an exemplary method of computing a normalized risk score for a single risk score type as in the system depicted in FIG. 3A operative in accordance with an embodiment of the invention.

Reference is now made to FIG. 7, which is a flowchart illustration of an exemplary method of computing normalized risk scores for a single risk type as in the system depicted in FIG. 3A. Prior to operation of system 10, a score Si of risk score type i is calculated for each user based on their activities over a particular analysis period. The risk score type may be, for example, related to volume (i.e. number of times a table is accessed over a period of time). Alternatively, the risk score type may be, for example, related to number of new events (i.e., how many times a new table is accessed within the database which had not previously been accessed). Other examples of risk score types may be related to a number of accessed records, a number of different tables accessed, or any other category or type of activity related to users' behavior. In embodiments of the invention, the calculated score Si is provided as or converted to a value between 0 and 1, corresponding to a risk level or probability (where 1 is the most risky or probable and 0 is the least). In the present invention, the score Si is provided (step 700) to risk score normalizer 30. A working threshold THi' in effect at the time is also provided (step 702) from working threshold adjustor 14 to risk score normalizer 30. The Si score is then normalized (step 704) based on the provided working threshold THi' such that the normalized Si score more accurately reflects the context. An example of a calculation of the normalized Si score is as follows:

Given the working threshold THi' that is in effect at the time:

$$Si'=1-\exp(-LSi*LTH/LTHi')$$

The above can also be written as:

$$Si'=1-\exp(-L(Si)*L(TH)/L(THi'))=1-\exp(-\log(1-Si)*\log(1-TH)/\log(1-THi'))$$

This formula for Si' has the following properties:
If Si=THi' then Si'=TH
If Si=0 then Si'=0
If Si is nearing 1 (the maximal score) Si' will also near 1.
Other formulas with similar properties can also be used.

The normalized score Si' is then used for reporting (step 706) the score of property i. This is better than reporting the original Si, because Si is adjusted to its context. That is, the same original score would be reported somewhat higher if it appears among much lower scores, or somewhat lower if it appears among much higher scores. The Si' scores of the various risk score types may also be used to compute a combined score, as will be described.

Figure 8:
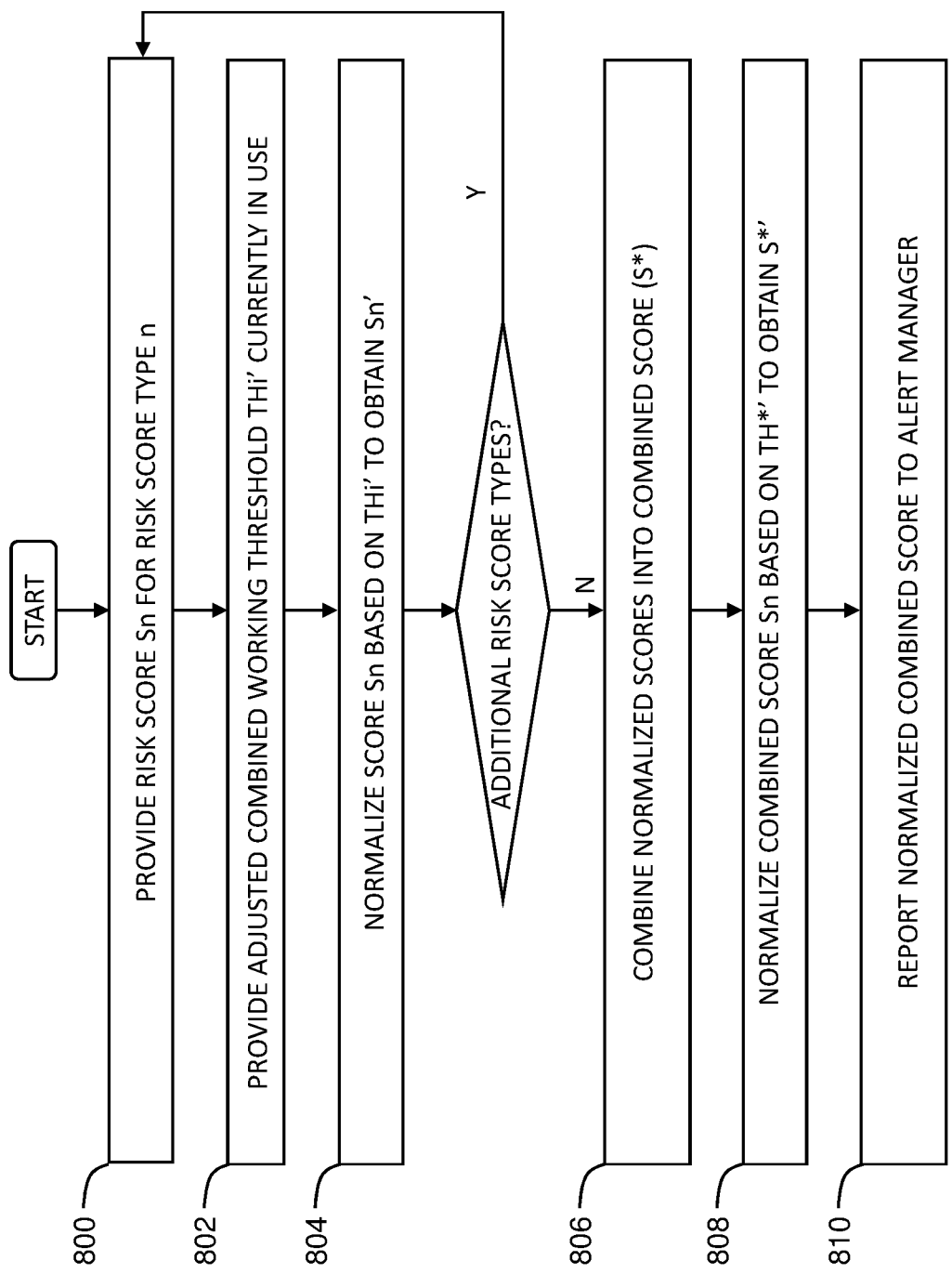
FIG. 8 is a flowchart illustration of an exemplary method of computing a normalized risk score for multiple risk score types as in the system depicted in FIG. 3B operative in accordance with an embodiment of the invention.

Reference is now made to FIG. 8, which is a flowchart illustration of an exemplary method of computing normalized multiple risk scores as in the system depicted in FIG. 3B. Prior to operation of system 10, a score S1, which is related to a first risk score type is calculated, a score S2 which is related to a second risk score type is calculated, and this is repeated until all relevant risk score types have a score associated with them. Each of the calculated scores S1 . . . Sn is provided (step 800) to risk score normalizer 30. A working threshold THi' in effect at the time is also provided (step 802) from working threshold adjustor 14 to risk score normalizer 30. The Si scores are then normalized (step 804) based on the provided working threshold THi' such that the normalized Si scores more accurately reflect the context. This may be done, for example, according to the formula described above in reference to FIG. 7 to obtain Si'. After the Si' scores have been computed for properties i=1 . . . K, they are combined (step 806) into a "combined" score S* as the maximum of the Si' values. Note that S*, like the other scores, is between 0 and 1 corresponding to the least and the most risky or probable events respectively.

S* is now treated just like a score coming from any other scorer. That is, a working threshold TH*' starts with TH and is adjusted along with the other working thresholds so that the budget is kept for the logged interval as much as possible. The budget for the S* "scorer" is the overall budget—i.e. B. The S* score is normalized into S*' (step 808) with the same formula as defined above for the other scorers, using the adjusted TH*' value in the place of THi'.

While the working threshold TH*' is in effect, TH*' is used as an alert threshold so that an alert is given for an event only if its S* score is >=TH*'. The S*' is a normalized S* score using working threshold TH*. The S* values computed for the new events are given as the "final" overall score of the events. An advantage of having combined scores is that in a case where a single event has multiple high risk scores, the budget will not be overly used up by repeat instances. The normalized combined score S*' is reported to alert manager 16 (step 810).

The following are examples using actual numbers to illustrate features of the present invention.

Example 1: An Example of a Calculation for a Single Risk Score Type is Provided

1) A budget is set as 2 alerts per hour.
2) A reference threshold TH is set at TH=0.9.
3) Each hour, the system keeps 2*budget (=4) top scores. The scores which are kept over that time are logged for two weeks (i.e. budget sliding interval window), and sorted in order of highest score to lowest score. This step is shown in FIG. 10 in table format. The current working threshold TH' is computed as follows:
   3a) The number of expected alerts in two weeks is computed. nExp=2 (alerts per hour)*336 (hours in two weeks)=672.
   3b) The value of score nExp+1(=673rd) as is stored as lowV(=0.92)
   3c) The minimal score which is higher than lowV is stored as highV(=0.93)
   3d) The working threshold TH'=max((lowV+highV)/2, TH)(=0.925)
4) Using the computed working threshold TH', the normalized scores are then computed as follows:
Given a score value S for user U, normalized score S' is computed:

$$\text{For } S<1: S'(S)=1-\exp(-L(S)*L(TH)/L(TH'))$$

$$\text{For } S=1: S'(S)=1 \text{ where } L(S)=-\ln(1-s)$$

$$S'(0.95)=1-\exp(\ln(1-0.95)*\ln(1-0.9)/\ln(1-0.925))=0.93$$

$$S'(0.925)=1-\exp(\ln(1-0.925)*\ln(1-0.9)/\ln(1-0.925))=0.9$$

$$S'(0.91)=1-\exp(\ln(1-0.925)*\ln(1-0.9)/\ln(1-0.925))=0.88$$

5) With the normalized score S' and the computed TH', the following rules may be used to determine whether to generate an alert:
   If a normalized score is above the reference threshold (S'>TH), produce an alert with score S'.
   If S=0.95, S'(0.95)=0.93>0.9 so generate an alert with a score of 0.93
   If S=0.91, S'(0.91)=0.88<0.9, so no alert is generated.

Example 2

An example of a calculation for multiple risk score types is provided.

Figure 11:
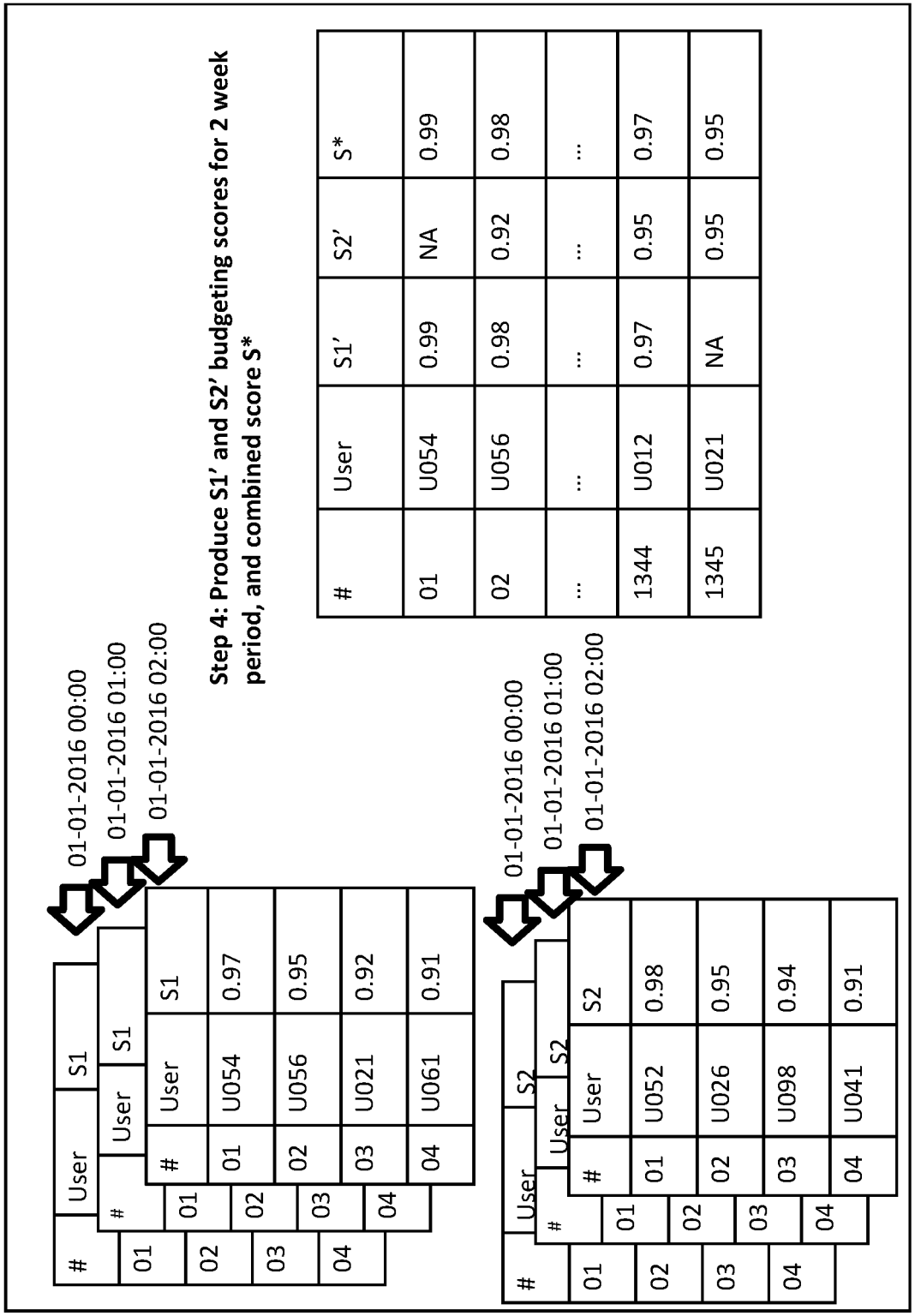
FIG. 11 is a chart illustration of a second example of a method in accordance with embodiments of the invention.

1) A budget is set as 4 alerts per hour (2 alerts per hour per risk score type).
2) A reference threshold TH is set at TH=0.9.
3) Each hour, the system keeps 2*budget (=4) top scores for each risk score type. The scores which are kept over that time are logged for two weeks (i.e. budget sliding interval window), and sorted in order of highest score to lowest score. This is shown in FIG. 11 in table format, for each of scores S1 for the first risk score type and scores S2 for a second risk type.
4) Scores S1 for the first risk score type, scores S2 for the second risk score type are normalized as described above for score S with respect to a single risk score type. As shown in FIG. 11, a table with scores S1 and S2 and a combined score S* may be used. Combined score S* is computed as maximum between scores:

$$S1'=S1'(S1); S2'=S2'(S2)$$

$$S^*=\max(S1', S2')$$

NA values indicate that the value of the corresponding score was low and was not recorded. NA values will be ignored for S*computation.
5) A combined threshold TH*' is calculated as follows:
   5a) The number of expected alerts in two weeks is computed. nExp=4 (alerts per hour)*336 (hours in two weeks)=1344.
   5b) The value of combined score S* # nExp+1(=1345th) is stored as lowV(=0.97)
   5c) The minimal score which is higher than lowV is stored as highV(=0.95)
   5d) The working threshold for combined score TH*'=max((lowV+highV)/2,TH)(=0.96)
6) Compute combined score S*=max(S1', S2'):

$$S^*=\max(0.98, 0.91)=0.98$$

7) Compute normalized combined score S*'=S*'(S*)

$$\text{For } S<1: S^{*\prime}(S^*)=1-\exp(-L(S^*)*L(TH)/L(TH^{*\prime})) \text{ for } s<1$$

$$\text{For } S=1: S^{*\prime}(S^*)=1$$

where $L(S)=-\ln(1-s)$ $$S^{*\prime}(0.98)=1-\exp(\ln(1-0.98)*\ln(1-0.9)/\ln(1-0.96))=0.94$$

8) Produce alert iff combined score is above the reference threshold S*'>=TH:

$$S^{*\prime}(0.98)=0.94>=0.9 \Rightarrow \text{produce alert with score } 0.94$$

Figure 9:
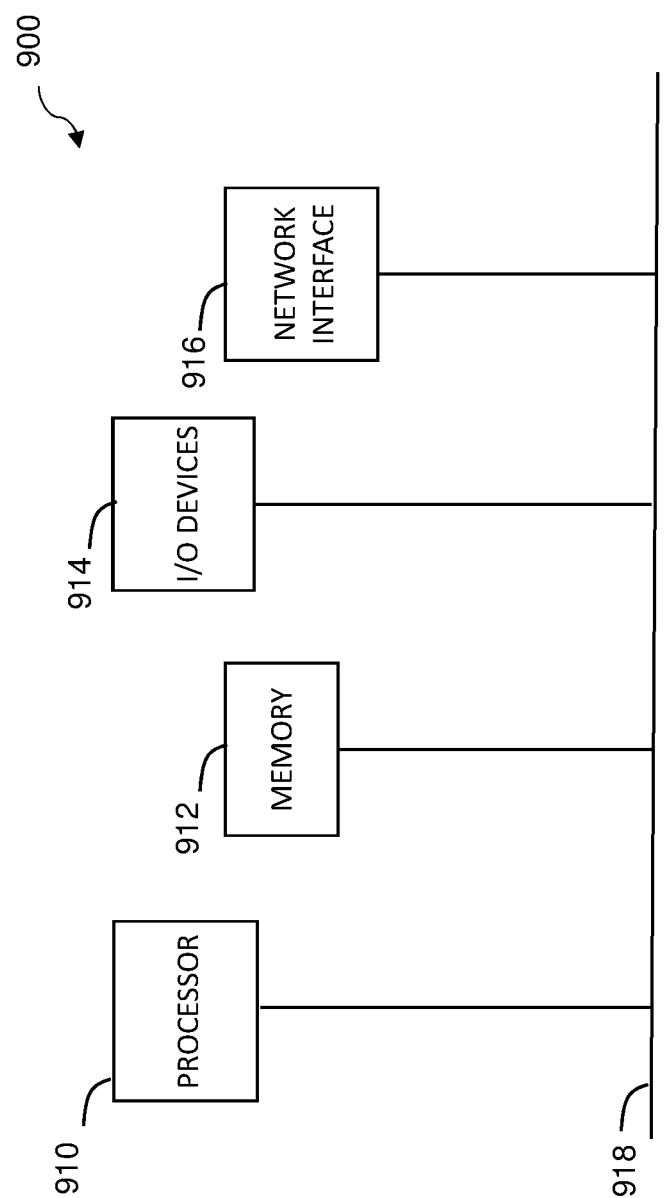
FIG. 9 is a simplified block diagram illustration of an exemplary hardware implementation of a computing system, constructed and operative in accordance with an embodiment of the invention.

Referring now to FIG. 9, block diagram 900 illustrates an exemplary hardware implementation of a computing system in accordance with which one or more components/methodologies of the invention (e.g., components/methodologies described in the context of FIGS. 1-8) may be implemented, according to an embodiment of the invention. As shown, the invention may be implemented in accordance with a processor 910, a memory 912, I/O devices 914, and a network interface 916, coupled via a computer bus 318 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

Embodiments of the invention may include a system, a method, and/or a computer program product. The computer program product may include a computer readable storage medium (or media) having computer readable program instructions thereon for causing a processor to carry out aspects of the invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the invention.

Aspects of the invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the invention have been presented r purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer program product for managing cooperative computer software applications, the computer program product comprising:
   a non-transitory, computer-readable storage medium; and
   computer-readable program code embodied in the storage medium, wherein the computer-readable program code is configured to
      set a budget indicating a number of alerts for suspicious activity by setting the budget equal to a selected targeted average rate of alerts produced by the system over a pre-determined period of time,
      adjust a working threshold risk score by defining an initial working threshold risk score, providing a history of recorded top risk scores within a budget sliding interval window, and adjusting the initial working threshold to an increased working threshold such that a number of the recorded top risk scores that exceed the initial working threshold is calculated to be less than or equal to the number of alerts indicated by the set budget,
      use the adjusted working threshold to normalize incoming risk scores, and
      determine whether an incoming risk score should receive an alert,
   wherein the computer-readable program code is further configured to set the budget for multiple risk score types, wherein each of the multiple risk score types receives a portion of the budget.

2. The computer program product according to claim 1 wherein the portion for one of the multiple risk score types is not equal to the portion for another of the multiple risk score types.

3. A computer program product for managing cooperative computer software applications, the computer program product comprising:
   a non-transitory, computer-readable storage medium; and
   computer-readable program code embodied in the storage medium, wherein the computer-readable program code is configured to
      set a budget indicating a number of alerts for suspicious activity by setting the budget equal to a selected targeted average rate of alerts produced by the system over a pre-determined period of time,
      adjust a working threshold risk score by defining an initial working threshold risk score, providing a history of recorded top risk scores within a budget sliding interval window, and adjusting the initial working threshold to an increased working threshold such that a number of the recorded top risk scores that exceed the initial working threshold is calculated to be less than or equal to the number of alerts indicated by the set budget,
use the adjusted working threshold to normalize incoming risk scores, and
determine whether an incoming risk score should receive an alert,
wherein the computer-readable program code is further configured to
include a first risk score for a first risk score type and a second risk score for a second risk score type, said first risk score and said second risk score normalized and combined into a combined risk score, and
define the working threshold as a combined working threshold, wherein the combined working threshold is combined score working threshold for combined risk scores.

* * * * *